United States Patent
Okumura

(10) Patent No.: US 7,479,761 B2
(45) Date of Patent: Jan. 20, 2009

(54) SECONDARY BATTERY CONTROL APPARATUS AND CONTROL METHOD FOR PREDICTING CHARGING IN REGENERATIVE BRAKING

(75) Inventor: Motoyoshi Okumura, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 123 days.

(21) Appl. No.: 10/574,418

(22) PCT Filed: Oct. 13, 2004

(86) PCT No.: PCT/JP2004/015464

§ 371 (c)(1),
(2), (4) Date: Apr. 4, 2006

(87) PCT Pub. No.: WO2005/039919

PCT Pub. Date: Jun. 5, 2005

(65) Prior Publication Data

US 2007/0018608 A1 Jan. 25, 2007

(30) Foreign Application Priority Data

Oct. 29, 2003 (JP) ............................. 2003-368962

(51) Int. Cl.
H01M 10/46 (2006.01)
(52) U.S. Cl. ..................................... 320/132
(58) Field of Classification Search ................. 320/104, 320/107, 132, 149
See application file for complete search history.

(56) References Cited

U.S. PATENT DOCUMENTS 6,225,784 B1 5/2001 Kinoshita et al.
7,100,558 B2 * 9/2006 Amanuma et al. ....... 123/179.4

FOREIGN PATENT DOCUMENTS

| JP | A 4-312304 | 11/1992 |
|---|---|---|
| JP | A 9-74605 | 3/1997 |
| JP | A 9-98503 | 4/1997 |
| JP | A 10-164761 | 6/1998 |
| JP | A 11-162523 | 6/1999 |
| JP | A 11-220810 | 8/1999 |
| JP | A 2001-69611 | 3/2001 |
| JP | A 2001-103613 | 4/2001 |
| JP | A 2002-58111 | 2/2002 |
| JP | A 2002-112402 | 4/2002 |
| JP | A 2003-199211 | 7/2003 |
| JP | A 2003-297435 | 10/2003 |

* cited by examiner

Primary Examiner—Edward Tso
(74) Attorney, Agent, or Firm—Oliff & Berridge, PLC

(57) ABSTRACT

A battery ECU executes a program that includes the steps of: sensing a vehicle speed; sensing a battery temperature; calculating a battery SOC; calculating, based on the battery temperature and battery SOC, a vehicle speed threshold value for starting charge limiting control; and setting a charge limiting flag for limiting an amount of electric energy to be to be charged even before regenerative braking, if the sensed vehicle speed is higher than the calculated vehicle speed threshold value.

36 Claims, 9 Drawing Sheets

F I G. 5
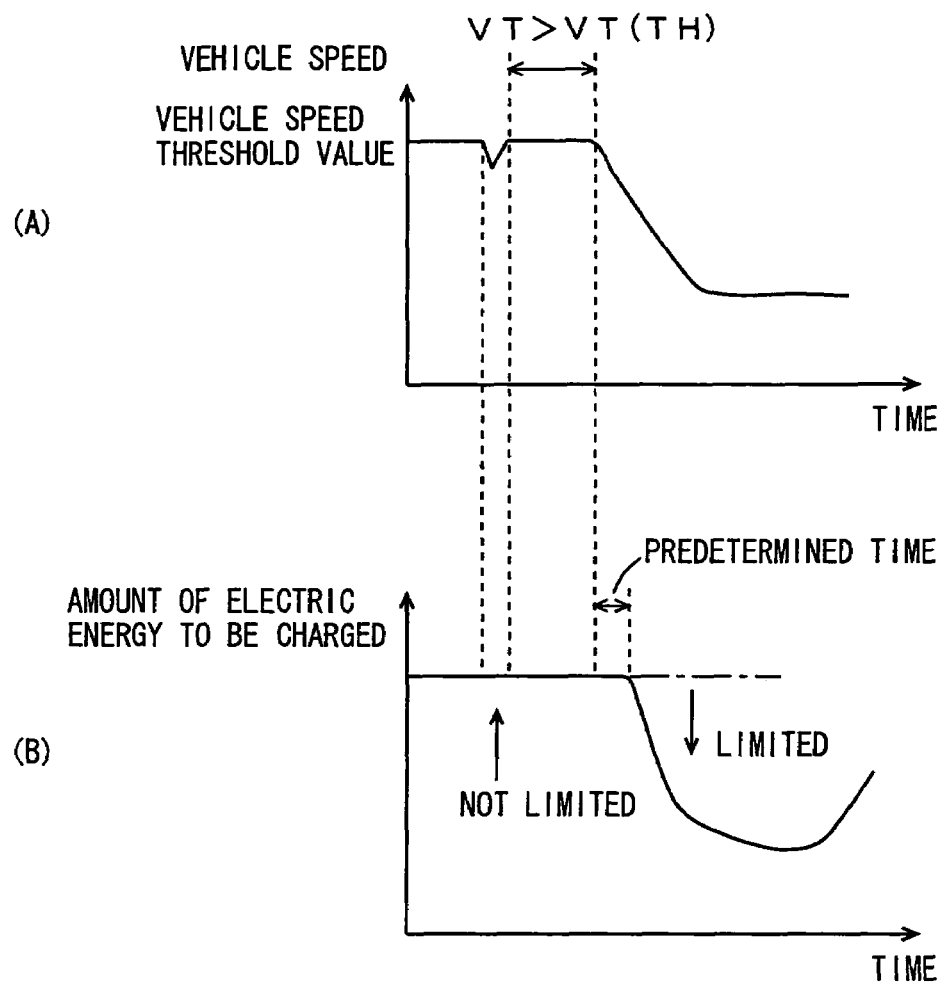

F I G. 7
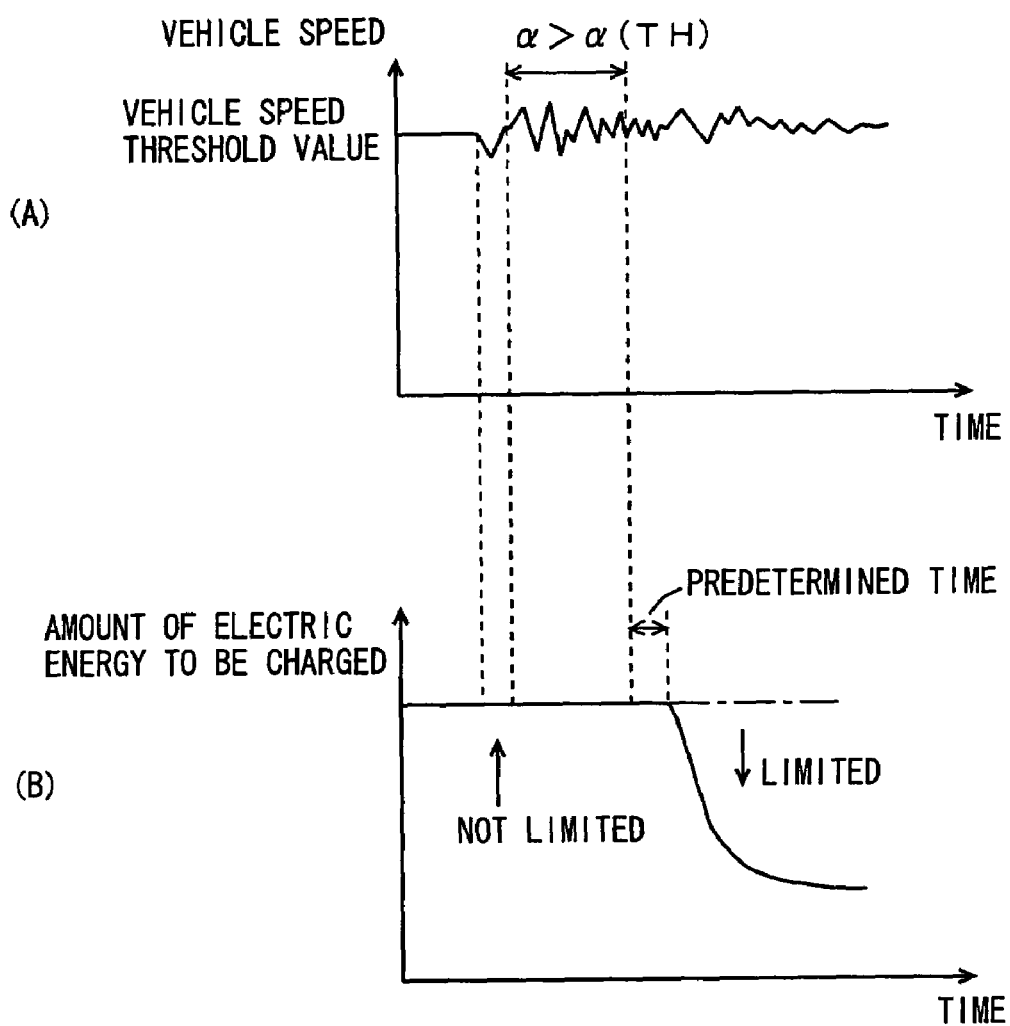

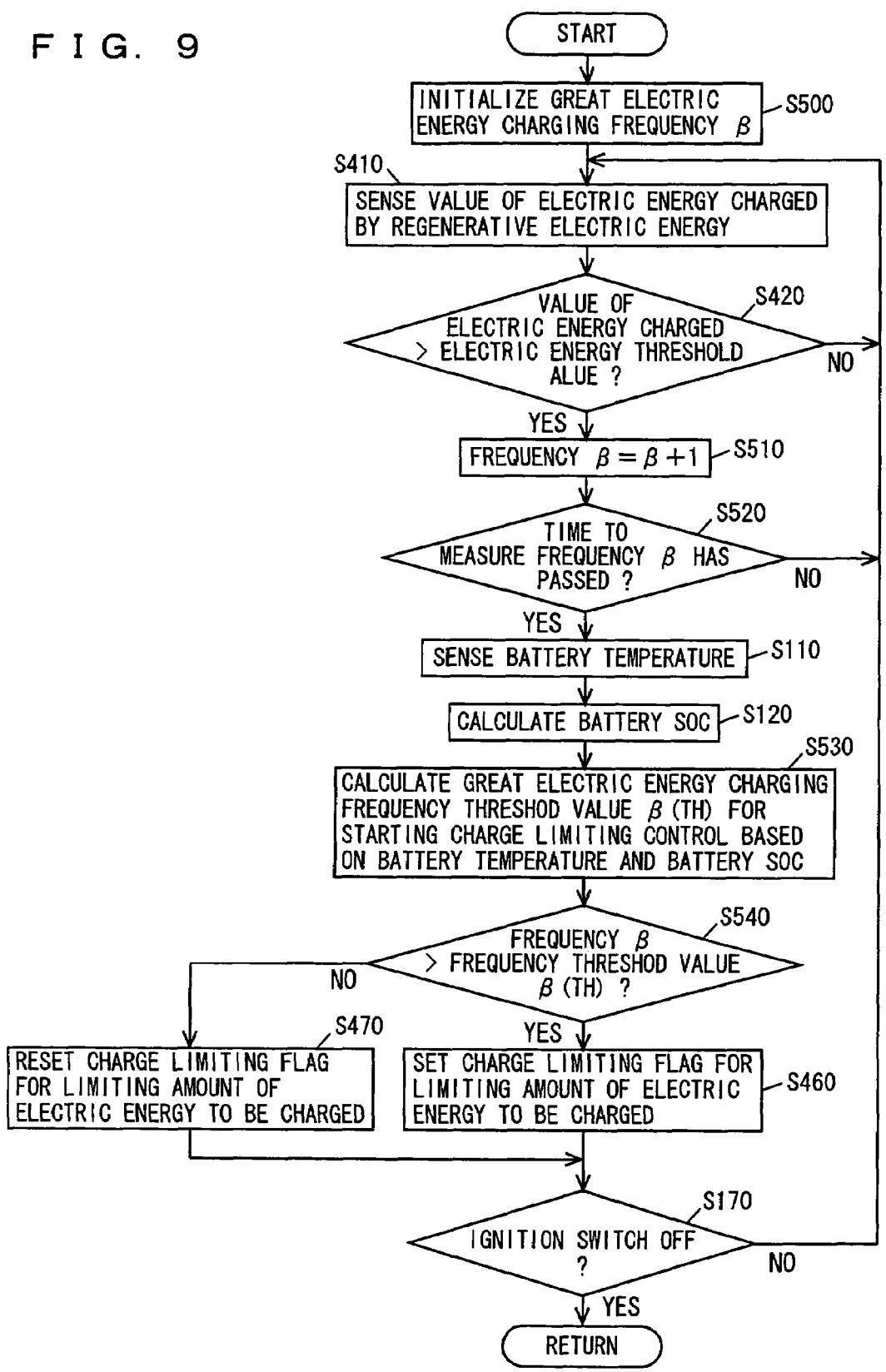

SECONDARY BATTERY CONTROL APPARATUS AND CONTROL METHOD FOR PREDICTING CHARGING IN REGENERATIVE BRAKING

TECHNICAL FIELD

The present invention relates to a technique for extending the lifetime of a secondary battery incorporated in a vehicle, and in particular, to a technique for limiting electric energy to be charged into a secondary battery in regenerative braking.

BACKGROUND ART

An electric vehicle, a hybrid vehicle and a fuel-cell vehicle that obtain driving force by an electric motor incorporate a secondary battery. In an electric vehicle, electric energy stored in the secondary battery is used to drive the electric motor in order to drive the vehicle. In a hybrid vehicle, electric energy stored in the secondary battery is used to drive the electric motor in order to drive the vehicle, and the electric motor assists the engine to drive the vehicle. In a fuel-cell vehicle, electric energy from the fuel cell is used to drive the electric motor in order to drive the vehicle, and electric energy stored in the secondary battery is used in addition to the electric energy from the fuel cell to drive the electric motor in order to drive the vehicle.

Such a vehicle has a function of regenerative braking, which is a function of causing an electric motor to serve as an electric generator in braking of the vehicle, so that the kinetic energy of the vehicle is converted into electric energy to achieve braking. The electric energy converted here is stored in the secondary battery and reused in acceleration and the like.

As over discharge and overcharge of the secondary battery impair the performance of the battery and shorten the lifetime, it is necessary to know the state of charge (SOC, also referred to as remaining capacity) of the secondary battery to control charging and discharging. In particular, with respect to the hybrid vehicle where an electric generator is driven by a heat engine incorporated in a vehicle to generate electric energy which is then charged into a secondary battery, the amount of electric energy to be charged is often controlled to be an approximately intermediate state (50-60%) between a full-charge state (100%) and a no-charge state (0%), so that the secondary battery can accept regenerated electric energy and also can supply the electric motor with electric energy immediately on request. For such control and also to extend the lifetime of the secondary battery, it is necessary to avoid over discharge and overcharge.

A hybrid vehicle control apparatus incorporating an electric energy storage mechanism including such a secondary battery is disclosed in Japanese Patent Laying-Open No. 11-220810. The publication discloses a hybrid vehicle control apparatus that more properly provides control of an amount of electric energy to be regenerated when the vehicle decelerates, prevents deterioration of the electric energy storage device, and executes sufficient assistance in driving when it is necessary. The hybrid vehicle control apparatus controls a hybrid vehicle having an engine rotating a drive axle of the vehicle, a motor assisting the engine in rotating the drive axle with electric energy and having a regeneration function of converting kinetic energy of the drive axle into electric energy, and electric energy storage means for supplying electric energy to the motor and storing electric energy output from the motor. The control apparatus includes traveling state detecting means for detecting a traveling state of the vehicle including at least a vehicle traveling speed, remaining capacity detecting means for detecting a remaining capacity of the electric energy storage means, and decelerating regenerative control means for controlling an amount of electric energy to be regenerated by the electric motor when the hybrid vehicle decelerates based on the output of the traveling state detecting means. The decelerating regenerative control means includes means for correcting the amount of electric energy to be regenerated based on the output of the remaining capacity detecting means.

According to the hybrid vehicle control apparatus disclosed in the publication, the amount of electric energy to be regenerated by the motor when the hybrid vehicle decelerates is controlled based on the output of the traveling state detecting means, and the amount of electric energy to be regenerated by the motor is corrected based on the remaining capacity of the electric energy storage means. Therefore, the hybrid vehicle control apparatus can more properly provide control of an amount of electric energy to be regenerated when the vehicle decelerates, prevent deterioration of the electric energy storage device, and execute sufficient assistance in driving when it is necessary.

On the other hand, according to the hybrid vehicle control apparatus disclosed in the publication, the an amount of electric energy to be regenerated is corrected based on the remaining capacity of the electric energy storage means. Here, when the remaining capacity of the electric energy storage means is smaller than a first prescribed remaining capacity, or when it is smaller than a second prescribed remaining amount that is greater than the first prescribed remaining amount and a latest integrated discharged amount is greater than a prescribed discharged amount, a regenerated quantity increasing corrective coefficient (>1.0) is calculated in accordance with a vehicle speed, whereby a decelerating regenerative quantity is corrected to increase. In other words, when the remaining capacity of the electric energy storage means is small, the decelerating regenerative quantity is corrected to increase so that greater regenerative electric energy is obtained. If a secondary battery (in particular, a nickel-metal hydride battery) that is one of the electric energy storage means is continuously charged with great power for a long period during regenerative braking operation, the temperature of the battery increases, whereby the battery is deteriorated and its lifetime is shortened. Further, increase in the temperature of the battery may decrease an amount of electric energy to be fully charged. Thus, even when the energy is actually charged only for low SOC, it may be determined that the SOC is high. Then the regenerative power may not be accepted and the fuel economy may be impaired.

If the amount of electric energy to be charged is controlled to be limited after sensing a large amount of input electric energy, the vehicle is decelerated not through engine braking or wheel braking but through regenerative braking (a motor/generator generates electricity) until such limiting is started. Here, if the amount of electric energy to be charged into the secondary battery is limited as it is excessively great, from that time point the regenerative braking is limited and the vehicle is decelerated through engine braking or wheel braking. Here, the automatic transmission automatically downshifts the gear in order to more strongly exert engine braking in the middle of deceleration whereby the engine speed is increased, or a brake control computer more strongly exerts wheel braking. Thus, while the driver is depressing the brake pedal in the same manner, he/she may feel awkwardness.

DISCLOSURE OF THE INVENTION

The present invention has been made to solve the aforementioned problems, and an object thereof is to provide a control apparatus and a control method for a secondary battery that controls an amount of electric energy to be charged in regenerative braking, so that the lifetime of the secondary battery incorporated in a vehicle is extended.

A control apparatus for a secondary battery according to an aspect of the present invention controls a secondary battery incorporated in a vehicle. The control apparatus includes: a sensing portion sensing a state quantity related to travel of the vehicle; a predicting portion predicting, ascribable to the state quantity, a degree of deterioration of the secondary battery due to charging in regenerative braking of the vehicle; and a limiting portion limiting, based on the predicted degree of deterioration, an amount of electric energy to be charged in the regenerative braking.

According to the present invention, in a hybrid vehicle, an electric vehicle and a fuel-cell vehicle that incorporate a motor/generator in order to assist an engine with the motor or in order to regenerate electric energy with the generator in regenerative braking, a state quantity related to the vehicle is sensed during travel of the vehicle. Here, for example a traveling speed of the vehicle, an amount of electric energy charged/discharged along the traveling and the like are sensed. When the speed, that is the state quantity of the vehicle, is high (for example, when the vehicle is cruising on a highway at a high speed), if the brake is actuated at the high speed thereafter, great regenerative braking electric energy is generated. If the secondary battery is charged with such great electric energy (great current), the battery is placed under great load and its temperature increases. The increase in the battery temperature promotes early deterioration of the battery. In light of such points, the predicting portion predicts a degree of deterioration of the secondary battery due to charging in regenerating braking of the vehicle. The limiting portion limits an amount of electric energy to be charged in regenerative braking. Thus, when deterioration of the battery is predicted based on the state quantity related to the travel of the vehicle, the amount of electric energy to be charged into the secondary battery in regenerative braking is limited so that an excessive increase in the battery temperature is prevented. Here, when limitation by the limiting portion is performed before the regenerative braking is started, there is no switching from regenerative braking to mechanical braking (downshifting and actuating engine braking and increasing wheel brake pressure) after the braking is started, the driver may not feel awkwardness. As a result, a control apparatus for a secondary battery controlling an amount of electric energy to be charged in regenerative braking so that the secondary battery incorporated in a vehicle can be provided.

Preferably, the predicting portion predicts a degree of deterioration ascribable to an increase in temperature of the secondary battery.

According to the present invention, based on a degree of deterioration along an increase in the temperature of the secondary battery, the amount of electric energy to be charged into the secondary battery is limited, and whereby an excessive increase in the temperature of the battery is suppressed and the lifetime of the secondary battery can be extended.

Further preferably, the predicting portion predicts the degree of deterioration to be higher as the increase in temperature of the secondary battery is predicted to be higher.

According to the present invention, the degree of deterioration is expected to be higher as the increase in the temperature of the battery is expected to be higher, and an amount of electric energy to be regenerated for the secondary battery is limited, and whereby an excessive increase in the temperature of the battery is suppressed and the lifetime of the secondary battery can be extended.

Further preferably, the sensing portion senses a vehicle speed of the vehicle. The predicting portion predicts the degree of deterioration to be higher as the vehicle speed is higher.

According to the present invention, when the vehicle speed is high, it is predicted that great regenerative braking electric energy is generated if thereafter brake is actuated at high speed. If the secondary battery is charged with such great electric energy (great current), the battery is placed under great load and its temperature increases, which promotes early deterioration of the battery. Accordingly, it is predicted that the degree of deterioration to be higher as the vehicle speed is higher, and the amount of electric energy to be charged into the secondary battery in regenerative braking of the vehicle is limited.

Further preferably, the sensing portion senses a vehicle speed of the vehicle. The predicting portion predicts the degree of deterioration to be high when a period during which the vehicle speed is higher than a predetermined speed lasts longer than a predetermined period.

According to the present invention, when the period where the vehicle speed is high lasts, it is predicted that great regenerative braking electric energy is generated if thereafter brake is actuated at high speed. Accordingly, it is predicted that the degree of deterioration to be higher when a period during which the vehicle speed is higher than a predetermined speed lasts longer, and the amount of electric energy to be charged into the secondary battery in regenerative braking of the vehicle is limited.

Further preferably, the sensing portion senses a vehicle speed of the vehicle. The predicting portion predicts the degree of deterioration to be high when a period during which the vehicle speed is higher than a predetermined speed continuously lasts longer than a predetermined period.

According to the present invention, when the period where the vehicle speed is high continuously lasts long, it is predicted that great regenerative braking electric energy is generated if thereafter brake is actuated at high speed. Accordingly, it is predicted that the degree of deterioration to be higher when a period during which the vehicle speed is higher than a predetermined speed lasts longer, and the amount of electric energy to be charged into the secondary battery in regenerative braking is limited. In such a case, when the period where the vehicle speed lasts not continuously (when the vehicle speed is high momentarily), the amount of electric energy to be charged into the secondary battery in regenerative braking is not limited and the secondary battery is charged with the regenerated electric energy.

Further preferably, the sensing portion senses a vehicle speed of the vehicle. The predicting portion predicts the degree of deterioration to be high when a frequency of the vehicle speed being higher than a predetermined speed is higher than a predetermined frequency.

According to the present invention, when a frequency that the vehicle speed is high (the number of times the vehicle speed becomes high in a predetermined period) is high, if the brake is actuated at the high speed thereafter, it is predicted that great regenerative braking electric energy may likely be generated. Accordingly, it is predicted that the degree of deterioration to be higher as a frequency of the vehicle speed being higher than a predetermined speed is higher, and the amount of electric energy to be charged into the secondary battery in regenerative braking is limited. In such a case, when the period where the vehicle speed lasts not continuously, the amount of electric energy to be charged into the secondary battery in regenerative braking is not limited and the secondary battery is charged with the regenerated electric energy.

Further preferably, the sensing portion senses an amount of electric energy to be charged into the secondary battery. The predicting portion predicts the degree of deterioration to be high when a period during which the amount of electric energy to be charged is greater than a predetermined amount of electric energy lasts longer than a predetermined period.

According to the present invention, the sensing portion senses the amount of electric energy to be charged into the secondary battery as the state quantity related to the travel of the vehicle. It is predicted that the degree of deterioration is higher as the period where the amount of electric energy to be charged into the secondary battery is great lasts longer, since an excessive increase in the temperature of the secondary battery is likely. Thus, the amount of electric energy to be charged into the secondary battery is limited.

Further preferably, the sensing portion senses an amount of electric energy to be charged into the secondary battery. The predicting portion predicts the degree of deterioration to be high when a period during which the amount of electric energy to be charged is greater than a predetermined amount of electric energy continuously lasts longer than a predetermined period.

According to the present invention, the sensing portion senses the amount of electric energy to be charged into the secondary battery as the state quantity related to the travel of the vehicle. It is predicted that the degree of deterioration is higher as the period where the amount of electric energy to be charged into the secondary battery is great continuously lasts longer, since an excessive increase in the temperature of the secondary battery is likely. Thus, the amount of electric energy to be charged into the secondary battery is limited.

Further preferably, the sensing portion senses an amount of electric energy to be charged into the secondary battery. The predicting predicts the degree of deterioration to be high when a frequency of the amount of electric energy to be charged being greater than a predetermined amount of electric energy is higher than a predetermined frequency.

According to the present invention, the sensing portion senses the amount of electric energy to be charged into the secondary battery as the state quantity related to the travel of the vehicle. It is predicted that the degree of deterioration is higher as the frequency where the amount of electric energy to be charged into the secondary battery is great is higher, since an excessive increase in the temperature of the secondary battery is likely. Thus, the amount of electric energy to be charged into the secondary battery is limited.

Further preferably, the predicting portion predicts a degree of deterioration of the secondary battery due to charging in regenerative braking of the vehicle, considering a state of the secondary battery.

According to the present invention, when the predicting portion makes determination of predicting the degree of deterioration of the secondary battery, for example it uses a threshold value that is determined considering the remaining capacity (SOC) of the secondary battery, that is the state of the secondary battery, or the threshold value determined considering the battery temperature of the secondary battery. Accordingly, the limitation on the electric energy to be charged may be loosened when the SOC of the battery is low, and it may be made strict when the battery temperature is high.

Further preferably, the control apparatus controls cooling capacity of a cooling apparatus based on the predicted degree of deterioration.

According to the present invention, a vehicle incorporating the secondary battery often incorporates a cooling apparatus for cooling the secondary battery. The control apparatus increases the cooling capacity (the air volume of the cooling air or the temperature of the cooling air) if the predicted degree of deterioration is great. By increasing the cooling capacity along with the limitation of the amount of the electric energy to be charged into the secondary battery, deterioration of the secondary battery can be suppressed and the lifetime thereof can be extended.

A control method for a secondary battery according to another aspect of the present invention is a control method for a secondary battery incorporated in a vehicle. The method includes the steps of: sensing a state quantity related to travel of the vehicle; predicting, ascribable to the state quantity, a degree of deterioration of the secondary battery due to charging in regenerative braking of the vehicle; and limiting, based on the predicted degree of deterioration, an amount of electric energy to be charged in the regenerative braking.

BRIEF DESCRIPTION OF THE DRAWINGS

FIG. 5 shows a state where electric energy to be charged is limited in the vehicle incorporating the battery ECU according to the second embodiment of the present invention.

FIG. 7 shows a state where electric energy to be charged is limited in the vehicle incorporating the battery ECU according to the third embodiment of the present invention.

FIG. 9 is flow chart showing a control configuration of a program executed at a battery ECU according to a fifth embodiment of the present invention.

BEST MODES FOR CARRYING OUT THE INVENTION

Figure 1:
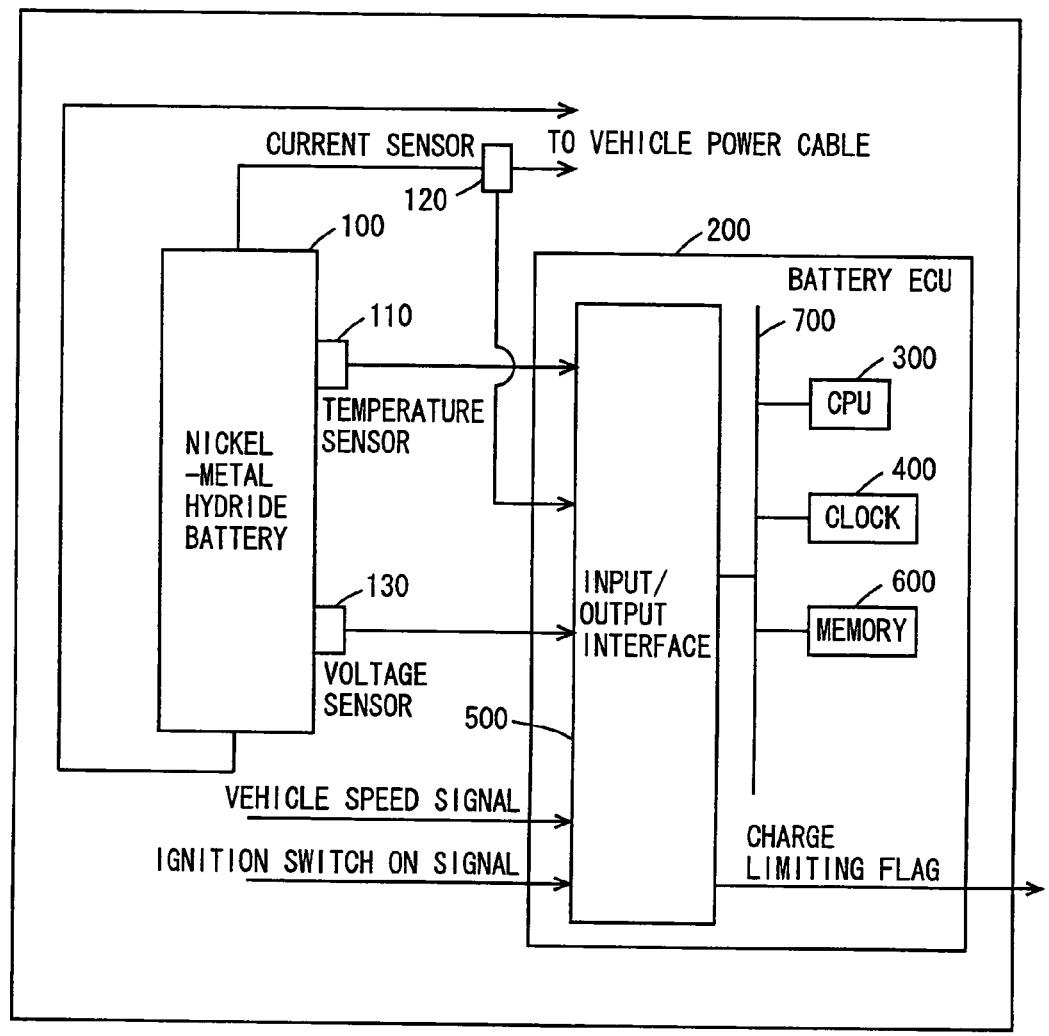
FIG. 1 is a control block diagram of a vehicle incorporating a battery ECU according to a first embodiment of the present invention.

In the following, referring to the drawings, embodiments of the present invention will be described. In the following description, the same reference character is allotted to the same parts. The name and function thereof are also the same. Accordingly, description thereof is not repeated.

In the following, description will be given as to an apparatus that controls electric energy to be charged into to the secondary battery, which supplies electric energy to driving devices and auxiliary electric appliances of a vehicle and supplied with electric energy from a motor/generator in regenerative braking. While the type of the secondary battery is not specifically limited, the secondary battery is assumed to be a nickel-metal hydride battery in the following description. The apparatus limiting the electric energy to be charged into the secondary battery according to the embodiment of the present invention is applicable to any of the electric vehicle, the hybrid vehicle and the fuel-cell vehicle.

First Embodiment

Referring to FIG. 1, description is given as to a power unit of a vehicle including a battery ECU (Electronic Control Unit) 200 that implements an apparatus limiting electric energy to be charged into a secondary battery according to the present embodiment. As shown in FIG. 1, the power unit of the vehicle includes a nickel-metal hydride battery 100 and a battery ECU 200.

To nickel-metal hydride battery 100, a temperature sensor 110 for measuring the temperature of nickel-metal hydride battery 100, and a voltage sensor 130 for measuring the voltage of nickel-metal hydride battery 100 are attached. To an output cable or an input cable connecting nickel-metal hydride battery 100 and a power cable of the vehicle, a current sensor 120 for measuring a charging/discharging current value is attached.

Battery ECU 200 includes temperature sensor 110, current sensor 120, voltage sensor 130, a vehicle speed signal line, an input/output interface 500 connected to an ignition-switch-on signal line and a charge limiting flag signal line, a CPU (Central Processing Unit) 300 controlling battery ECU 200, a clock 400, and a memory 600 storing various data. A power supply terminal of nickel-metal hydride battery 100 is connected to a vehicle power cable to supply electric energy to a traveling motor, auxiliary electric appliances and the like of the vehicle.

A temperature signal sensed by temperature sensor 100 measuring the temperature of nickel-metal hydride battery 100 is transmitted to CPU 300 via input/output interface 500 of battery ECU 200.

A current value sensed by current sensor 120 measuring a charging current value into nickel-metal hydride battery 100 and a discharging current value from nickel-metal hydride battery 100 is transmitted to CPU 300 via input/output interface 500 of battery ECU 200. CPU 300 is capable of calculating SOC by integrating the current values over time.

A voltage value sensed by voltage sensor 130 measuring the voltage of nickel-metal hydride battery 100 is transmitted to CPU 300 via input-output interface 500 of battery ECU 200. CPU 300 is capable of calculating SOC based on an open circuit voltage (PCV) measured with a predetermined condition, and calculating an electric energy value by multiplying the voltage value sensed by voltage sensor 130 and the current value sensed by current sensor 120.

Inside battery ECU 200, input/output interface 500, CPU 300, clock 400 and memory 600 are connected via internal bus 700, and capable of conducting data communication with one another. Memory 600 stores a program executed at CPU 300, threshold values to be used in the program and the like.

Battery ECU 200 sets the charging limiting flag for limiting electric energy to be charged into the secondary battery and transmits it to an ECU (for example, a hybrid ECU) that controls the motor/generator. The hybrid ECU controls the motor/generator to limit regenerative electric energy, and controls air volume or cooling temperature of a cooling fan provided to the secondary battery.

Figure 2:
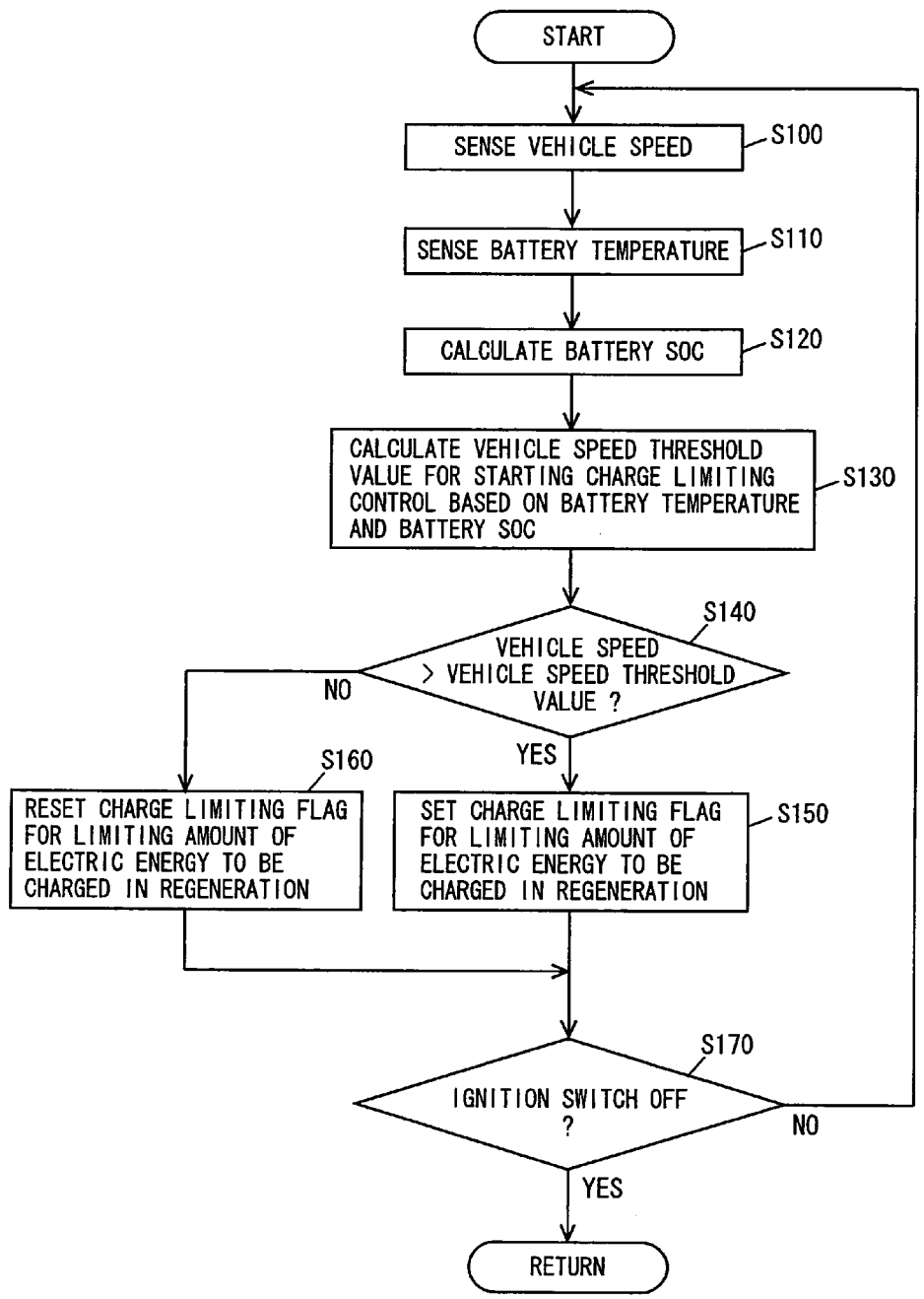
FIG. 2 is a flow chart showing a control configuration of a program executed at the battery ECU according to the first embodiment of the present invention.

Referring to FIG. 2, a control configuration of a program executed at CPU 300 of battery ECU 200 that is an apparatus for limiting electric energy to be charged into a secondary battery according to the present embodiment will be described.

At step (hereinafter step is abbreviated as S) 100, CPU 300 senses a vehicle speed. At S110, CPU 300 senses a battery temperature. At S120, CPU 300 calculates battery SOC.

The vehicle speed at S100 is calculated based on a vehicle speed signal input via input/output interface 500; the battery temperature sensed at S110 is calculated based on a temperature signal input from temperature sensor 110 via input/output interface 500; and the battery SOC calculated at S120 is calculated by integrating current values by integrating current values based on a current value signal input from current sensor 120 via input/output interface 500.

At S130, CPU 300 calculates a vehicle speed threshold value for starting charge limiting control based on the battery temperature and the battery SOC. Here, it is calculated so that the vehicle speed threshold value is lower as the battery temperature is higher; and the vehicle speed threshold value is higher as the battery SOC is lower.

At S140, CPU 300 determines as to whether or not the sensed vehicle speed is higher than the calculated vehicle speed threshold value. If the sensed vehicle speed is higher than the calculated vehicle speed threshold value (YES at S140), then the process goes to S150. Otherwise (NO at S140), the process goes to S160.

At S150, CPU 300 sets charge limiting flag for limiting an amount of electric energy to be charged in regeneration.

At S160, CPU 300 resets charge limiting flag for limiting an amount of electric energy to be charged in regeneration.

At S170, CPU 300 determines as to whether or not an ignition switch is turned off. This determination is made based on an ignition-switch-on signal input via input/output interface 500. If ignition switch is off(YES at S170), then the process ends. Otherwise (NO at S170), the process goes back to S100 and the process steps of S100-S170 are repeatedly performed.

An operation of a vehicle incorporating battery ECU 200 according to the present embodiment based on the above-described structure and flowchart will be described. When the vehicle is traveling, a vehicle speed is sensed (S100), a battery temperature is sensed (S110), and current values sensed by current sensor 120 sensing the current passing through nickel-metal hydride battery 100 are integrated, whereby a battery SOC is calculated (S120). Based on the battery temperature and the battery SOC, a vehicle speed threshold value for starting charge limiting control is calculated (S130). If the sensed vehicle speed is higher than the calculated vehicle speed threshold value (YES at S140), then a charge limiting flag limiting an amount of electric energy to be charged in regeneration is set (S150). Such a process is repeatedly performed as long as the ignition switch is turned off, that is, as long as the vehicle is traveling.

Figure 3:
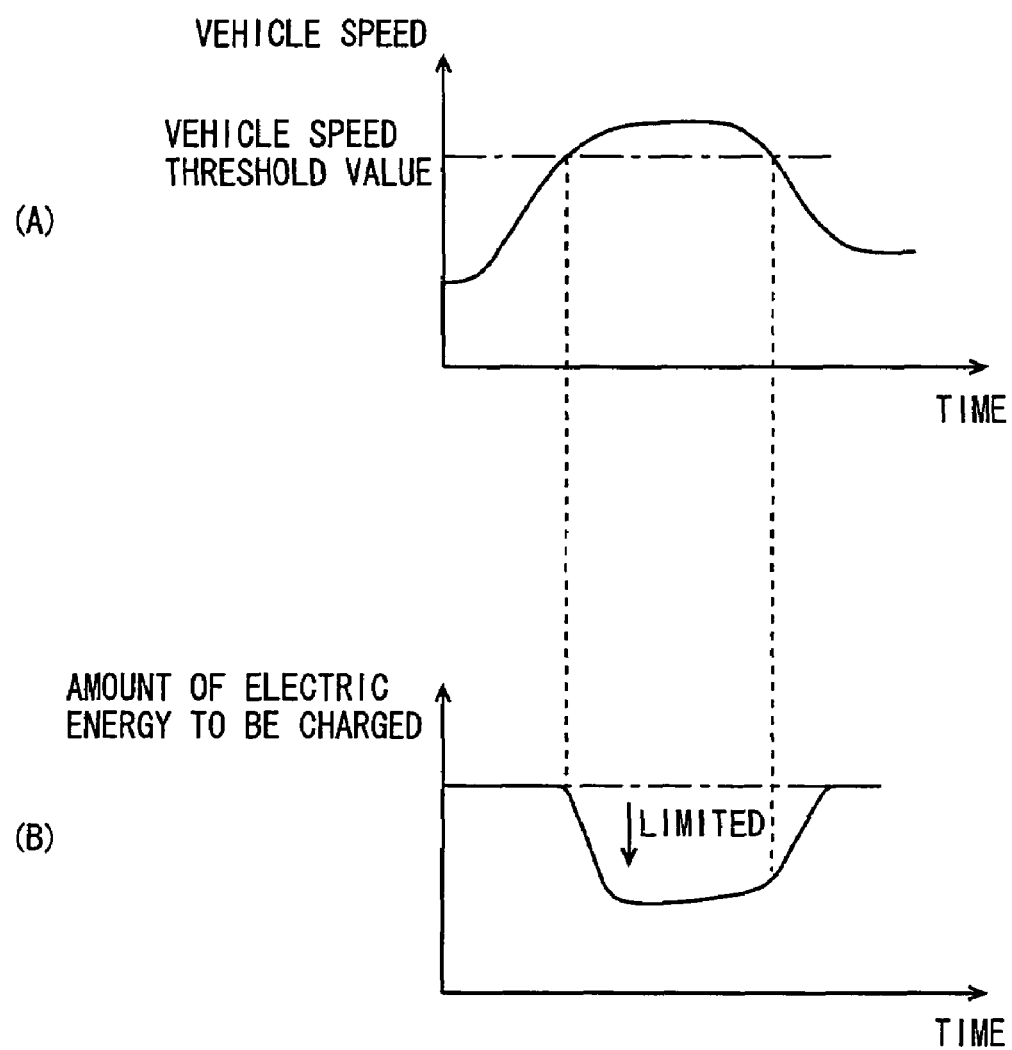
FIG. 3 shows a state where electric energy to be charged is limited in the vehicle incorporating the battery ECU according to the first embodiment of the present invention.

FIG. 3(A) shows the change of the vehicle speed over time, whereas FIG. 3(B) shows the change of the amount of electric energy to be charged over time. As shown in FIG. 3(A), in a vehicle incorporating the battery ECU according to the present embodiment, at the time point where a vehicle speed exceeds a vehicle speed threshold value, control to limit the amount of electric energy to be charged is provided. Specifically, a charge limiting flag is set (S150), and based on the charge limiting flag being set, for example a hybrid ECU provides control to limit the amount of electric energy to be regenerated.

As above, according to the battery ECU according to the present embodiment, based on the battery temperature and the battery SOC, a vehicle speed threshold value for starting charge limiting control is calculated. If the vehicle speed exceeds the vehicle speed threshold value, then great regenerated electric energy is charged into the nickel-metal hydride battery in regenerative breaking, which may rapidly increase the temperature of the nickel-metal hydride battery and cause deterioration of the battery. Accordingly, at the time point where the vehicle speed has exceeded the vehicle speed threshold value and before regenerative braking is started, the charge limiting flag is set to limit the amount of electric energy to be charged into the nickel-metal hydride battery. Thus, an excessive increase in the temperature of the nickel-metal hydride battery can be suppressed, deterioration thereof can be prevented, and the lifetime thereof can be extended.

Second Embodiment

In the following, description is given as to an apparatus limiting an amount of electric energy to be charged into a secondary battery according to a second embodiment of the present invention. The present embodiment is implemented with the same hardware configuration (control block diagram) as the above-described first embodiment. It is different from the first embodiment only in that the program executed at CPU 300 of battery ECU 200 is different. Accordingly, detailed description except for that is not repeated here.

Figure 4:
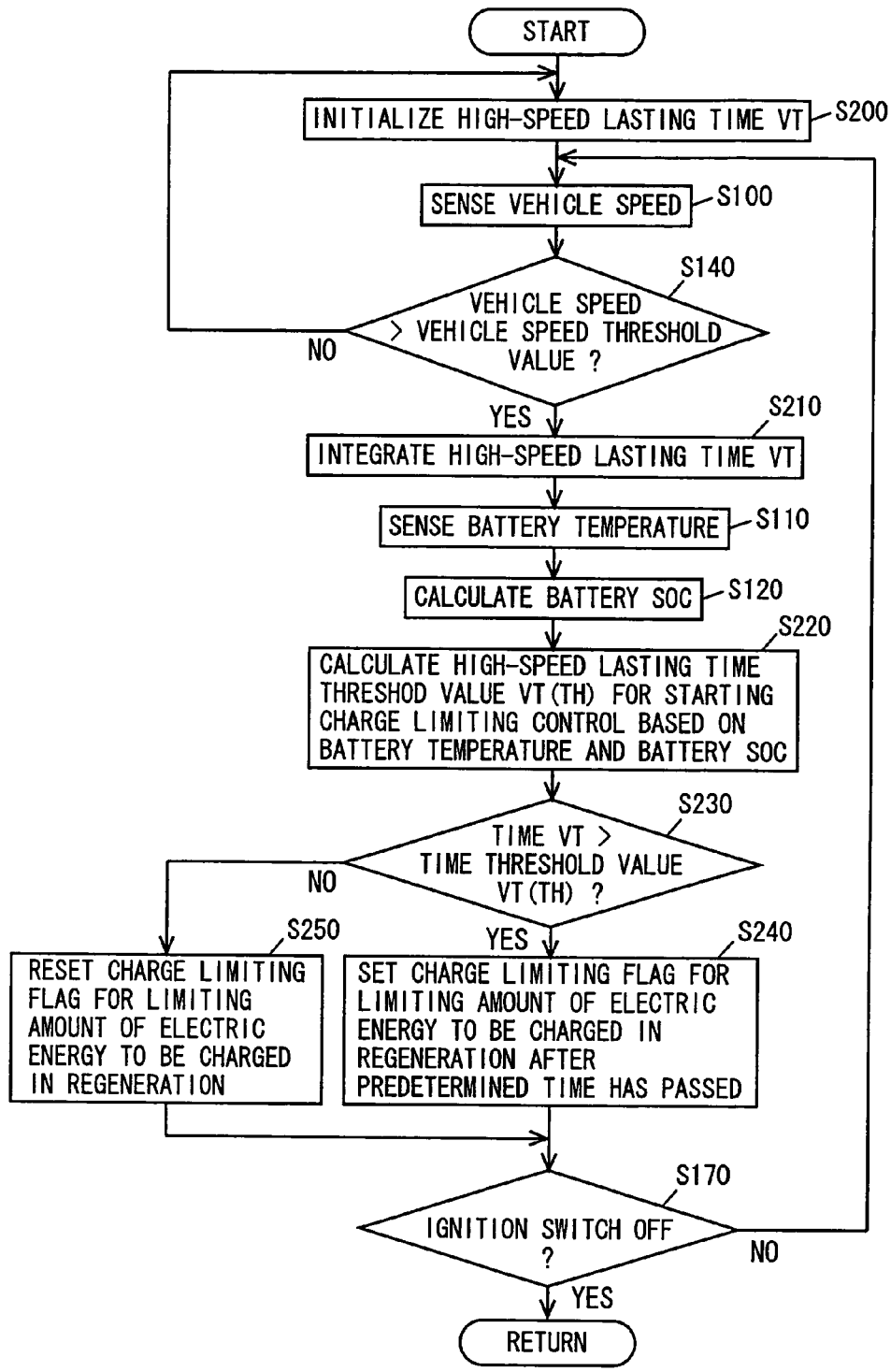
FIG. 4. is a flow chart showing a control configuration of a program executed at a battery ECU according to a second embodiment of the present invention.

Referring to FIG. 4, description is given as to a control configuration of a program executed at CPU 300 of battery ECU 200 that is an apparatus limiting an amount of electric energy to be charged into a secondary battery according to the present embodiment. In the flow chart of FIG. 4, the same step numbers are allotted to the same process steps as in the flow chart shown in the above-described FIG. 2. The process thereof is also the same. Accordingly, detailed description is not repeated here.

At S200, CPU300 initializes a high-speed lasting time VT. It is noted that high-speed lasting time VT is treated as a variable in CPU 300.

At S210, high-speed lasting time VT is integrated. At S220, based on the battery temperature and the battery SOC, a high-speed lasting time threshold value VT(TH) for starting charge limiting control is calculated. Here, it is calculated so that high-speed lasting time threshold value VT(TH) is lower as the battery temperature is higher, and high-speed lasting time threshold value VT(TH) is higher as battery SOC is lower.

At S230, CPU 300 determines as to whether or not integrated high-speed lasting time VT is greater than calculated high-speed lasting time threshold value VT(TH). If high-speed lasting time VT is higher than high-time continuing time threshold value VT(TH) (YES at S230), then the process goes to S240. Otherwise (NO at S230), the process goes to S250.

At S240, CPU 300 sets a charge limiting flag for limiting an amount of electric energy to be charged in regeneration, after a predetermined time has elapsed.

At S250, CPU 300 resets the charge limiting flag for limiting an amount of electric energy to be charged in regeneration.

An operation of a vehicle incorporating battery ECU 200 according to the present embodiment based on the above-described structure and flowchart will be described.

When the ignition switch is turned on, high-speed lasting time VT is initialized (S200). The vehicle speed is sensed (S100). If the vehicle speed is higher than the vehicle speed threshold value (YES at S140), high-speed lasting time VT is integrated (S210). Here, when the vehicle speed is at least at the vehicle speed threshold value (NO at S140), then high-speed lasting time VT is initialized (S200). In other words, high-speed lasting time VT is integrated as long as the vehicle speed is higher than the vehicle speed threshold value, and high-speed lasting time VT is initialized once the vehicle speed is at least at the vehicle speed threshold value.

High-speed lasting time threshold value VT(TH) for starting charge limiting control is calculated based on the battery temperature and the battery SOC (S220). If integrated high-speed lasting time VT is greater than calculated high-speed lasting time threshold value VT(TH) (YES at S230), after a predetermined time has elapsed, a charge limiting flag for limiting an amount of electric energy to be charged in regeneration is set (S240).

FIG. 5(A) shows the change of the vehicle speed over time, whereas FIG. 5(B) shows the change of the amount of electric energy to be charged over time. As shown in FIG. 5(A), if a vehicle speed greater than the vehicle speed threshold value is greater than high-speed lasting time threshold value VT(TH), then after a predetermined time has elapsed from that time point, a charge limiting flag for limiting an amount of electric energy to be charged is set. Thus, as shown in FIG. 5(B), an amount of electric energy to be charged into nickel-metal hydride battery 100 is limited.

As above, according to the battery ECU according to the present embodiment, if a state where a vehicle speed is continuously greater than the vehicle speed threshold value is greater than high-speed lasting time threshold value VT(TH) calculated based on the battery temperature and the battery SOC, control is provided so as to limit the amount of electric energy to be charged in regeneration. Specifically, when a state where the vehicle speed is high continues, great regenerated electric energy is charged into the nickel-metal hydride battery in the regeneration braking that follows. Accordingly, a charge limiting flag for limiting an amount of electric energy to be charged in regeneration is set in advance, so that a certain limit is placed on the amount of electric energy to be charged. As a result, the nickel-metal hydride battery will not be charged with great electric energy and an excessive increase in the temperature of the nickel-metal hydride battery is prevented. Thus, deterioration of the nickel-metal hydride battery can be prevented and the lifetime thereof can be extended.

It is noted that, in the flow chart of FIG. 4, when NO at S140, the process may not go back to S200 but may go back to S100. Thus, not only when the vehicle speed is continuously higher than the vehicle speed threshold value, but also when the vehicle speed temporarily drops and when the state where the vehicle speed is higher than the vehicle speed threshold value intermittently lasts, control can be provided so as to limit the amount of electric energy to be charged in regenerative braking.

Third Embodiment

In the following, description will be given as to an apparatus for limiting an amount of electric energy to be charged into a secondary battery according to a third embodiment of the present invention. Similarly to the above-described second embodiment, the hardware configuration (control block diagram) thereof is the same as in the above-described first embodiment. Accordingly, detailed description thereof is not repeated here.

Figure 6:
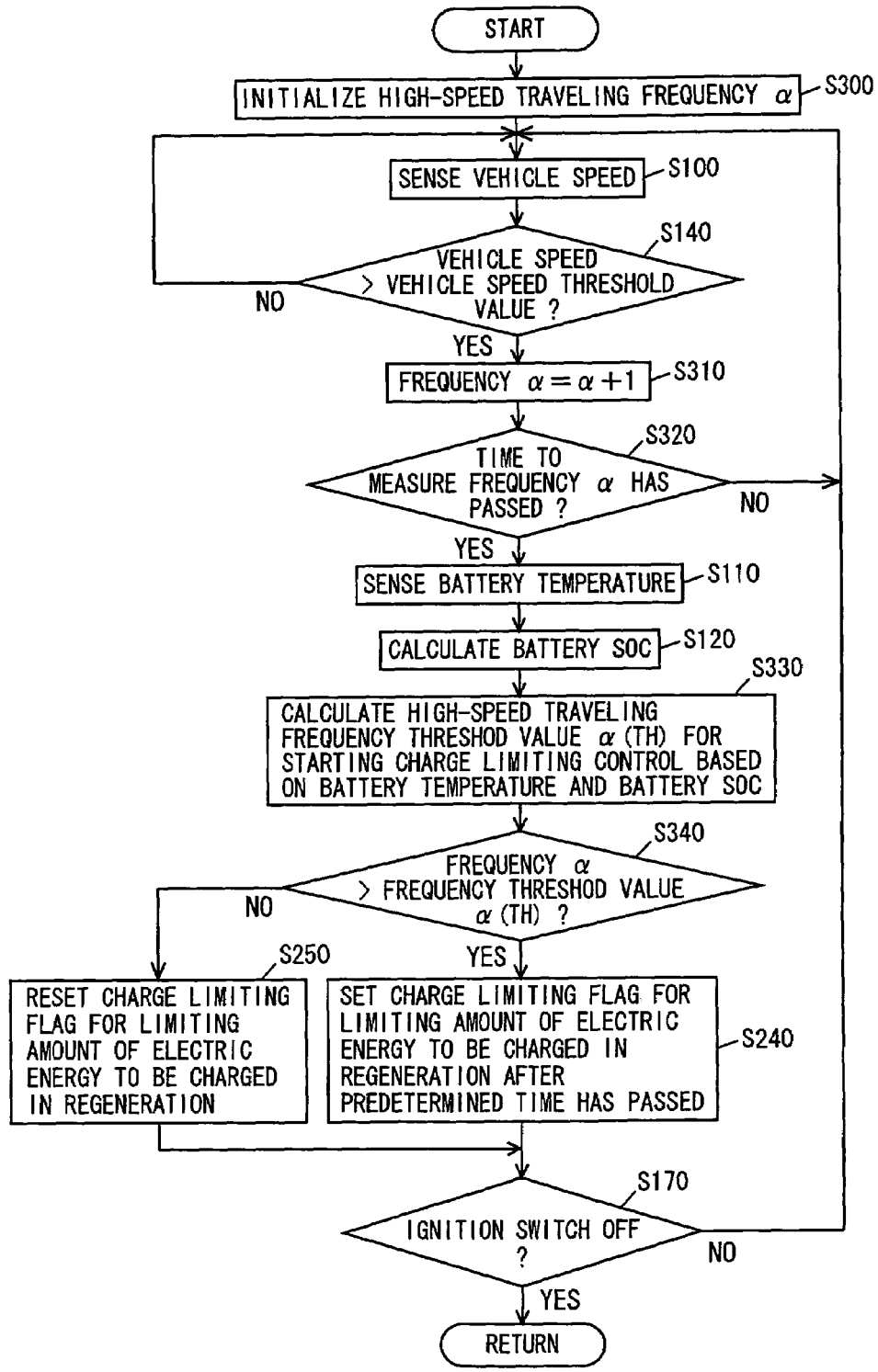
FIG. 6 is flow chart showing a control configuration of a program executed at a battery ECU according to a third embodiment of the present invention.

Referring to FIG. 6, description is given as to a control configuration of a program executed at CPU 300 of battery ECU 200 according to the present embodiment. In the flow chart of FIG. 6, the same step numbers are allotted to the same process steps as in the flow chart shown in the above-described FIGS. 2 and 4. The process thereof is also the same. Accordingly, detailed description is not repeated here.

At S300, CPU 300 initializes high-speed traveling frequency α. It is noted that high-speed traveling frequency α is treated as a variable in CPU 300.

At S310, CPU 300 adds 1 to frequency α. At S320, CPU 300 determines whether or not the time to measure frequency α has passed. If the time to measure frequency α has passed (YES at S320), the process goes to S110. Otherwise (NO at S320), the process goes back to S100.

At S330, CPU 300 calculates high-speed traveling frequency threshold value α(TH) for starting charge limiting control, based on the battery temperature and battery SOC. At S340, CPU 300 determines as to whether or not calculated frequency α is greater than calculated frequency threshold value α(TH). If calculated frequency α is greater than calculated frequency threshold value α(TH) (YES at S340), the process goes to S240. Otherwise (NO at S340), the process goes to S250.

An operation of a vehicle incorporating battery ECU 200 according to the present embodiment based on the above-described structure and flowchart will be described.

When the ignition switch is turned on, high-speed traveling frequency α is initialized (S300). A vehicle speed is sensed while the vehicle is traveling (S100). If the vehicle speed is higher than the vehicle speed threshold value (YES at S140), then 1 is added to frequency α (S310). Until the time to measure frequency α passes, such process steps are repeatedly performed.

When the time to measure frequency α passes (YES at S320), a battery temperature is sensed (S110), a battery SOC is calculated (S120), and high-speed traveling frequency threshold value α(TH) for starting charge limiting control is calculated based on the battery temperature and the battery SOC (S330). When calculated frequency α is greater than calculated high-speed traveling frequency threshold value α(TH), after a predetermined time, a charge limiting flag for limiting an amount of electric energy to be charged in regeneration is set (S240).

FIG. 7(A) shows the change of the vehicle speed over time, whereas FIG. 7(B) shows the change of the amount of electric energy to be charged over time. As shown in FIG. 7(A), high-speed traveling frequency α, which is the frequency where the vehicle speed is higher than the vehicle speed threshold value, is measured. When frequency α is greater than high-speed traveling frequency threshold value α(TH) (YES at S340), then after a predetermined time from that time point, a charge limiting flag for limiting an amount of electric energy to be charged in regeneration is set (S240), and the amount of electric energy to be charged is limited as shown in FIG. 7(B).

As above, according to the battery ECU according to the present embodiment, based on the high-speed traveling frequency, when the frequency is high, control is provided so as to limit the amount of electric energy to be charged in regeneration. The frequency of the vehicle speed being higher than the vehicle speed threshold value means that great regenerative electric energy is likely to be generated in regenerative braking after the high-speed travel. Accordingly, the amount of electric energy to be charged into the nickel-metal hydride battery is limited in advance. Thus, an excessive increase in the temperature of the nickel-metal hydride battery can be suppressed, deterioration thereof can be prevented, and the lifetime thereof can be extended.

Fourth Embodiment

In the following, description is given as to an apparatus limiting an amount of electric energy to be charged into a secondary battery according to a fourth embodiment. Similarly to the above-described second and third embodiments, the hardware configuration (control block diagram) thereof is the same as in the above-described first embodiment. Accordingly, detailed description thereof is not repeated here.

Figure 8:
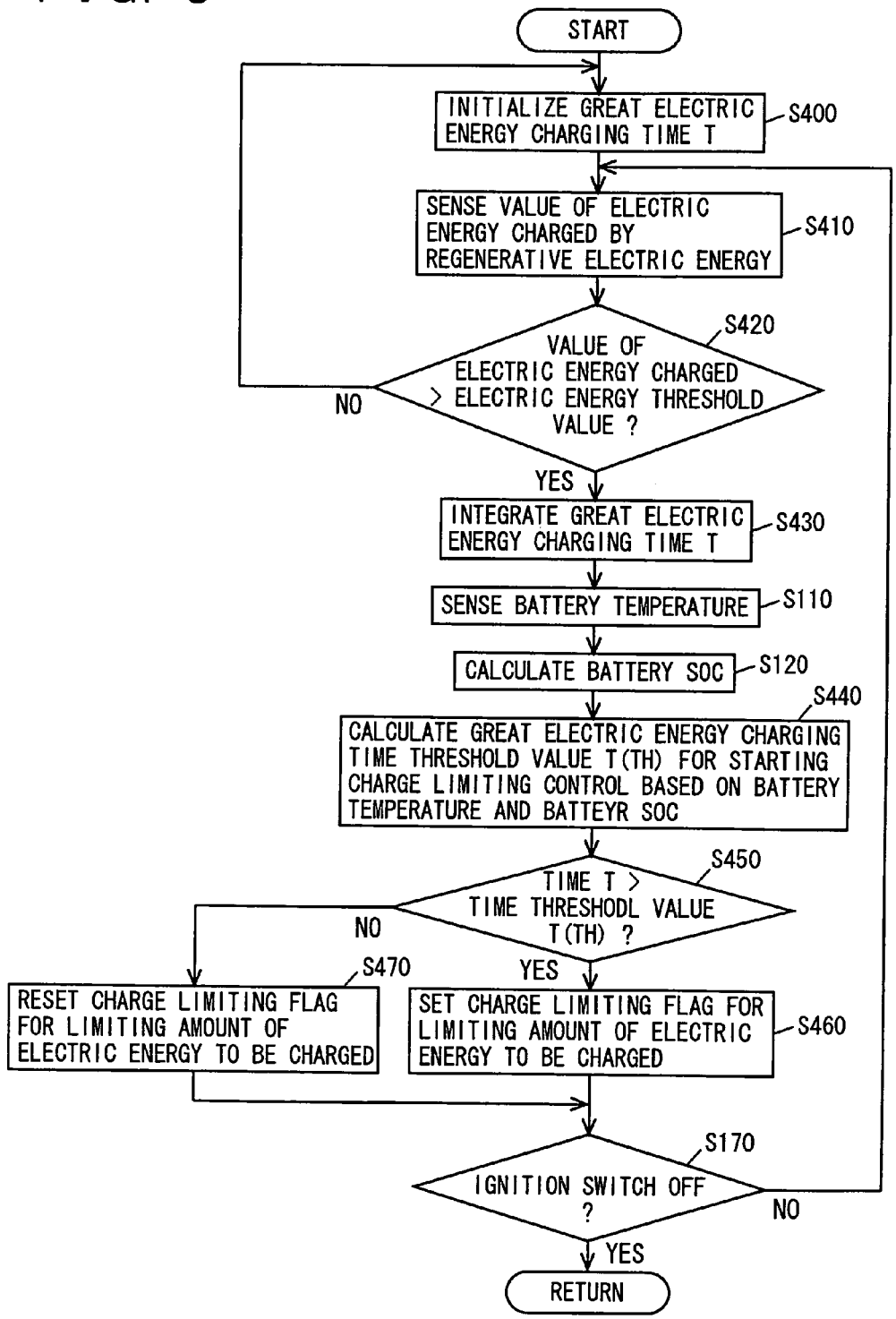
FIG. 8 is flow chart showing a control configuration of a program executed at a battery ECU according to a fourth embodiment of the present invention.

Referring to FIG. 8, description is given as to a control configuration of a program executed at CPU 300 of battery ECU 200 according to the present embodiment. In the flow chart of FIG. 8, the same step numbers are allotted to the same process steps as in the flow chart shown in the above-described FIG. 2. The process thereof is also the same. Accordingly, detailed description is not repeated here.

At S400, CPU 300 initializes great electric energy charging time T. It is noted that great electric energy charging time T is treated as a variable in CPU 300.

At S410, CPU 300 senses a value of electric energy charged by regenerative electric energy. Here, CPU 300 senses the value of electric energy charged by regenerative electric energy based on a current value sensed by current sensor 120 and a voltage value sensed by a voltage sensor 130.

At S420, CPU 300 determines as to whether or not the sensed value of electric energy charged is greater than a predetermined electric energy threshold value. If the sensed value of electric energy charged is greater than the predetermined electric energy threshold value (YES at S420), then the process goes to S430. Otherwise (NO at S420), the process goes back to S400.

At S430, CPU 300 integrates great electric energy charging time T. At S440, CPU 300 calculates great electric energy charging time threshold value T(TH) for starting charge limiting control, based on the battery temperature and the battery SOC. At S450, CPU 300 determines as to whether or not integrated great electric energy charging time T is greater than calculated great electric energy charging time threshold value T(TH). If integrated great electric energy charging time T is greater than calculated great electric energy charging time threshold value T(TH) (YES at S450), then the process goes to S460. Otherwise (NO at S450), the process goes to S470.

At S460, CPU sets a charge limiting flag for limiting an amount of electric energy to be charged. At S470, CPU 300 resets the charge limiting flag for limiting an amount of electric energy to be charged.

An operation of a vehicle incorporating battery ECU 200 according to the present embodiment based on the above-described structure and flowchart will be described.

When the ignition switch is turned on, great electric energy charging time T is initialized (S400). A value of electric energy charged by regenerative electric energy is sensed (S410). When the sensed value of electric energy charged is greater than a predetermined electric energy threshold value (YES at S420), great electric energy charging time T is integrated (S430). Based on the battery temperature and the battery SOC, great electric energy charging time threshold value T(TH) is calculated (S440). If the calculated great electric energy charging time T is greater than great electric energy charging time threshold value T(TH) (YES at S450), the charge limiting flag is set (S460).

On the other hand, if calculated great electric energy charging time T is at least at great electric energy charging time threshold value T(TH) (NO at S450), the charge limiting flag is reset (S470). Such processing steps are repeatedly performed until the ignition switch is turned off (YES at S170).

Thus, battery ECU 200 senses the value of electric energy charged by regenerative electric energy based on the current value sensed by current sensor 120 and the voltage value sensed by voltage sensor 130 (S410), and integrates great electric energy charging time T where the value of electric energy charged is greater than the predetermined electric energy threshold value (S430). When integrated great electric energy charging time T is greater than great electric energy charging time threshold value T(TH) calculated based on the battery temperature and the battery SOC, the charge limiting flag is set (YES at S450, S460).

As above, according to the battery ECU of the present embodiment, the value of electric energy charged into the-nickel-metal hydride battery by regenerative energy is sensed. Great electric energy charging time T, where the value of electric energy charged is greater than the predetermined electric energy threshold value, is integrated and calculated. When integrated great electric energy charging time T is greater than great electric energy charging time threshold value T(TH) calculated based on the battery temperature and the battery SOC, charge limiting control is executed. As a result, limitation on charging is executed by the time in which the amount of electric energy charged into the nickel-metal hydride battery is great lasts. As a result, an excessive increase in the temperature of the nickel-metal hydride battery can be suppressed, deterioration thereof can be prevented, and the lifetime thereof can be extended.

Fifth Embodiment

In the following, description is given as to an apparatus limiting an amount of electric energy to be charged into a secondary battery according to a fifth embodiment of the present invention. Similarly to the above-described second to fourth embodiments, the hardware configuration (control block diagram) thereof is the same as in the above-described first embodiment. Accordingly, detailed description thereof is not repeated here.

Referring to FIG. 9, description is given as to a control configuration of a program executed at CPU 300 of battery ECU 200 according to the present embodiment. In the flow chart of FIG. 9, the same step numbers are allotted to the same process steps as in the flow chart shown in the above-described FIG. 8. The process thereof is also the same. Accordingly, detailed description is not repeated here.

At S500, CPU 300 initializes great electric energy charging frequency $\beta$. It is noted that great electric energy charging frequency $\beta$ is treated as a variable in CPU 300.

At S510, CPU 300 adds 1 to frequency $\beta$. At S520, CPU 300 determines as to whether or not a time to measure frequency $\beta$ has passed. If the time to measure frequency $\beta$ has passed (YES at S520), the process goes to S110. Otherwise (NO at S520), the process goes back to S410.

At S530, CPU 300 calculates great electric energy charging frequency threshold value $\beta(TH)$ for starting charge limiting control, based on the battery temperature and the battery SOC. At S540, CPU 300 determines as to whether great electric energy charging frequency $\beta$ is greater than calculated great electric energy charging frequency threshold value $\beta(TH)$. If great electric energy charging frequency $\beta$ is greater than calculated great electric energy charging frequency threshold value $\beta(TH)$ (YES at S540), then the process goes to S460. Otherwise (NO at S540), the process goes to S470.

An operation of a vehicle incorporating battery ECU 200 according to the present embodiment based on the above-described structure and flowchart will be described.

When the ignition switch is turned on, great electric energy charging frequency $\beta$ is initialized (S500). A value of electric energy to be charged by regenerative electric energy is sensed (S410). If the value of electric energy to be charged is greater than the electric energy threshold value (YES at S420), 1 is added to frequency $\beta$ (S510). Until the time to measure frequency $\beta$ has passed (NO at S520), the process steps are repeatedly performed.

When the time to measure frequency $\beta$ has passed, a battery temperature is sensed (S110), and a battery SOC is calculated (S120). Based on the battery temperature and the battery SOC, great electric energy charging frequency threshold value $\beta(TH)$ is calculated (S530). When great electric energy charging frequency $\beta$ is greater than calculated great electric energy charging frequency threshold value $\beta(TH)$ (YES at S540), the charge limiting flag limiting an amount of electric energy to be charged is set (S460).

As above, according to the battery ECU of the present embodiment, a value of electric energy to be charged into the nickel-metal hydride battery is sensed. When the frequency, where value of electric energy to be charged is greater than an electric energy threshold value, is greater than a threshold value, control is exerted so as to limit the amount of electric energy to be charged. As a result, an excessive increase in the temperature of the nickel-metal hydride battery can be suppressed, deterioration thereof can be prevented, and the lifetime thereof can be extended.

While the above-described first to third embodiments relate to control for limiting an amount of electric energy to be charged based on a vehicle speed, and the above-described fourth and fifth embodiments relate to control for limiting an amount of electric energy to be charged based on a value of electric energy charged, the present invention is not limited to such embodiments. The first to fifth embodiments may be combined as appropriate to be implemented.

It should be understood that the embodiments disclosed herein are illustrative and non-restrictive in every respect. The scope of the present invention is defined by the terms of the claims, rather than the description and example above, and is intended to include any modifications and changes within the scope and meaning equivalent to the terms of the claims.

The invention claimed is:

1. A control apparatus for a secondary battery incorporated in a vehicle, comprising:
    sensing means for sensing a state quantity related to travel of said vehicle;
    predicting means for predicting, ascribable to said state quantity, a degree of deterioration of said secondary battery due to charging in regenerative braking of said vehicle; and
    limiting means for limiting, based on said predicted degree of deterioration, an amount of electric energy to be charged in said regenerative braking.

2. The control apparatus for a secondary battery according to claim 1, wherein
    said predicting means includes means for predicting a degree of deterioration ascribable to an increase in temperature of said secondary battery.

3. The control apparatus for a secondary battery according to claim 2, wherein
    said predicting means includes means for predicting said degree of deterioration to be higher as the increase in temperature of said secondary battery is predicted to be higher.

4. The control apparatus for a secondary battery according to claim 1, wherein
said sensing means includes means for sensing a vehicle speed of said vehicle, and
said predicting means includes means for predicting said degree of deterioration to be higher as said vehicle speed is higher.

5. The control apparatus for a secondary battery according to claim 1, wherein
said sensing means includes means for sensing a vehicle speed of said vehicle, and
said predicting means includes means for predicting said degree of deterioration to be high when a period during which said vehicle speed is higher than a predetermined speed lasts longer than a predetermined period.

6. The control apparatus for a secondary battery according to claim 1, wherein
said sensing means includes means for sensing a vehicle speed of said vehicle, and
said predicting means includes means for predicting said degree of deterioration to be high when a period during which said vehicle speed is higher than a predetermined speed continuously lasts longer than a predetermined period.

7. The control apparatus for a secondary battery according to claim 1, wherein
said sensing means includes means for sensing a vehicle speed of said vehicle, and
said predicting means includes means for predicting said degree of deterioration to be high when a frequency of said vehicle speed being higher than a predetermined speed is higher than a predetermined frequency.

8. The control apparatus for a secondary battery according to claim 1, wherein
said sensing means includes means for sensing an amount of electric energy to be charged into said secondary battery, and
said predicting means includes means for predicting said degree of deterioration to be high when a period during which said amount of electric energy to be charged is greater than a predetermined amount of electric energy lasts longer than a predetermined period.

9. The control apparatus for a secondary battery according to claim 1, wherein
said sensing means includes means for sensing an amount of electric energy to be charged into said secondary battery, and
said predicting means includes means for predicting said degree of deterioration to be high when a period during which said amount of electric energy to be charged is greater than a predetermined amount of electric energy continuously lasts longer than a predetermined period.

10. The control apparatus for a secondary battery according to claim 1, wherein
said sensing means includes means for sensing an amount of electric energy to be charged into said secondary battery, and
said predicting means includes means for predicting said degree of deterioration to be high when a frequency of said amount of electric energy to be charged being greater than a predetermined amount of electric energy is higher than a predetermined frequency.

11. The control apparatus for a secondary battery according to claim 1, wherein
said predicting means includes means for predicting a degree of deterioration of said secondary battery due to charging in regenerative braking of said vehicle, considering a state of said secondary battery.

12. The control apparatus for a secondary battery according to claim 1, wherein
cooling means for cooling said secondary battery is incorporated in said vehicle, and
said control apparatus further comprises control means for controlling cooling capacity of said cooling means based on said predicted degree of deterioration.

13. A control method for a secondary battery incorporated in a vehicle, comprising the steps of:
sensing a state quantity related to travel of said vehicle;
predicting, ascribable to said state quantity, a degree of deterioration of said secondary battery due to charging in regenerative braking of said vehicle; and
limiting, based on said predicted degree of deterioration, an amount of electric energy to be charged in said regenerative braking.

14. The control method for a secondary battery according to claim 13, wherein
said step of predicting a degree of deterioration of said secondary battery includes a step of predicting a degree of deterioration ascribable to an increase in temperature of said secondary battery.

15. The control method for a secondary battery according to claim 14, wherein
said step of predicting a degree of deterioration of said secondary battery includes a step of predicting said degree of deterioration of said secondary battery to be higher as the increase in temperature of said secondary battery is predicted to be higher.

16. The control method for a secondary battery according to claim 13, wherein
said step of sensing a state quantity includes a step of sensing a vehicle speed of said vehicle, and
said step of predicting a degree of deterioration of said secondary battery includes a step of predicting said degree of deterioration to be higher as said vehicle speed is higher.

17. The control method for a secondary battery according to claim 13, wherein
said step of sensing a state quantity includes a step of sensing a vehicle speed of said vehicle, and
said step of predicting a degree of deterioration of said secondary battery includes a step of predicting said degree of deterioration to be high when a period during which said vehicle speed is higher than a predetermined speed lasts longer than a predetermined period.

18. The control method for a secondary battery according to claim 13, wherein
said step of sensing a state quantity includes a step of sensing a vehicle speed of said vehicle, and
said step of predicting a degree of deterioration of said secondary battery includes a step of predicting said degree of deterioration to be high when a period during which said vehicle speed is higher than a predetermined speed continuously lasts longer than a predetermined period.

19. The control method for a secondary battery according to claim 13, wherein
said step of sensing a state quantity includes a step of sensing a vehicle speed of said vehicle, and
said step of predicting a degree of deterioration of said secondary battery includes a step of predicting said degree of deterioration to be high when a frequency of said vehicle speed being higher than a predetermined speed is higher than a predetermined frequency.

20. The control method for a secondary battery according to claim 13, wherein
said step of sensing a state quantity includes a step of sensing an amount of electric energy to be charged into said secondary battery, and said step of predicting a degree of deterioration of said secondary battery includes a step of predicting said degree of deterioration to be high when a period during which said amount of electric energy to be charged is greater than a predetermined amount of electric energy lasts longer than a predetermined period.

21. The control method for a secondary battery according to claim 13, wherein
said step of sensing a state quantity includes a step of sensing an amount of electric energy to be charged into said secondary battery, and
said step of predicting a degree of deterioration of said secondary battery includes a step of predicting said degree of deterioration to be high when a period during which said amount of electric energy to be charged is greater than a predetermined amount of electric energy continuously lasts longer than a predetermined period.

22. The control method for a secondary battery according to claim 13, wherein
said step of sensing a state quantity includes a step of sensing an amount of electric energy to be charged into said secondary battery, and
said step of predicting a degree of deterioration of said secondary battery includes a step of predicting said degree of deterioration to be high when a frequency of said amount of electric energy to be charged being greater than a predetermined amount of electric energy is higher than a predetermined frequency.

23. The control method for a secondary battery according to claim 13, wherein
said step of predicting a degree of deterioration of said secondary battery includes a step of predicting a degree of deterioration of said secondary battery due to charging in regenerative braking of said vehicle, considering a state of said secondary battery.

24. The control method for a secondary battery according to claim 13, wherein
a secondary battery cooling apparatus for cooling said secondary battery is incorporated in said vehicle, and
said control method further comprises a step of controlling cooling capacity of said secondary battery cooling apparatus based on said predicted degree of deterioration.

25. A control apparatus for a secondary battery incorporated in a vehicle, comprising:
a sensor sensing a state quantity related to travel of said vehicle; and
an electronic control unit predicting, ascribable to said state quantity, a degree of deterioration of said secondary battery due to charging in regenerative braking of said vehicle, and limiting, based on said predicted degree of deterioration, an amount of electric energy to be charged in said regenerative braking.

26. The control apparatus for a secondary battery according to claim 25, wherein
said electronic control unit predicts a degree of deterioration ascribable to an increase in temperature of said secondary battery.

27. The control apparatus for a secondary battery according to claim 26, wherein
said electronic control unit predicts said degree of deterioration to be higher as the increase in temperature of said secondary battery is predicted to be higher.

28. The control apparatus for a secondary battery according to claim 25, wherein
said sensor includes a sensor sensing a vehicle speed of said vehicle, and
said electronic control unit predicts said degree of deterioration to be higher as said vehicle speed is higher.

29. The control apparatus for a secondary battery according to claim 25, wherein
said sensor includes a sensor sensing a vehicle speed of said vehicle, and
said electronic control unit predicts said degree of deterioration to be high when a period during which said vehicle speed is higher than a predetermined speed lasts longer than a predetermined period.

30. The control apparatus for a secondary battery according to claim 25, wherein
said sensor includes a sensor sensing a vehicle speed of said vehicle, and
said electronic control unit predicts said degree of deterioration to be high when a period during which said vehicle speed is higher than a predetermined speed continuously lasts longer than a predetermined period.

31. The control apparatus for a secondary battery according to claim 25, wherein
said sensor includes a sensor sensing a vehicle speed of said vehicle, and
said electronic control unit predicts said degree of deterioration to be high when a frequency of said vehicle speed being higher than a predetermined speed is higher than a predetermined frequency.

32. The control apparatus for a secondary battery according to claim 25, wherein
said sensor includes a sensor sensing an amount of electric energy to be charged into said secondary battery, and
said electronic control unit predicts said degree of deterioration to be high when a period during which said amount of electric energy to be charged is greater than a predetermined amount of electric energy lasts longer than a predetermined period.

33. The control apparatus for a secondary battery according to claim 25, wherein
said sensor includes a sensor sensing an amount of electric energy to be charged into said secondary battery, and
said electronic control unit predicts said degree of deterioration to be high when a period during which said amount of electric energy to be charged is greater than a predetermined amount of electric energy continuously lasts longer than a predetermined period.

34. The control apparatus for a secondary battery according to claim 25, wherein
said sensor includes a sensor sensing an amount of electric energy to be charged into said secondary battery, and
said electronic control unit predicts said degree of deterioration to be high when a frequency of said amount of electric energy to be charged being greater than a predetermined amount of electric energy is higher than a predetermined frequency.

35. The control apparatus for a secondary battery according to claim 25, wherein
said electronic control unit predicts a degree of deterioration of said secondary battery due to charging in regenerative braking of said vehicle, considering a state of said secondary battery.

36. The control apparatus for a secondary battery according to claim 25, wherein
a cooling fan for cooling said secondary battery is incorporated in said vehicle, and
said electronic control unit controls cooling capacity of said cooling fan based on said predicted degree of deterioration.

\* \* \* \* \*